United States Patent [19]

Moore-Searson

[11] 4,015,080
[45] Mar. 29, 1977

[54] DISPLAY DEVICES

[75] Inventor: Leslie Donald Moore-Searson, Tunbridge Wells, England

[73] Assignee: Elliott Brothers (London) Limited, Chelmsford, England

[22] Filed: Jan. 13, 1976

[21] Appl. No.: 648,731

Related U.S. Application Data

[63] Continuation-in-part of Ser. No. 465,146, April 29, 1974, abandoned.

[30] Foreign Application Priority Data

Apr. 30, 1973 United Kingdom ............ 20400/73

[52] U.S. Cl. .................. 358/104; 178/DIG. 20; 358/109
[51] Int. Cl.$^2$ ........................... H04N 7/18
[58] Field of Search ........... 178/DIG. 20, 7.8, 7.85, 178/7.88, DIG. 24

[56] References Cited

UNITED STATES PATENTS

| | | | |
|---|---|---|---|
| 3,230,819 | 1/1966 | Noxon | 178/DIG. 20 |
| 3,418,459 | 12/1968 | Purdy | 178/DIG. 20 |
| 3,449,721 | 6/1969 | Dertouzos | 340/172.5 |
| 3,521,227 | 7/1970 | Congleton | 178/DIG. 20 |
| 3,521,228 | 7/1970 | congleton | 178/DIG. 20 |
| 3,666,887 | 5/1972 | Freeman | 178/DIG. 20 |
| 3,668,622 | 6/1972 | Gannett | 178/DIG. 20 |
| 3,673,323 | 6/1972 | Gustafson | 178/DIG. 24 |
| 3,697,154 | 10/1972 | Johnson | 178/7.88 |
| 3,885,095 | 5/1975 | Wolfson | 178/DIG. 20 |

*Primary Examiner*—Richard Murray
*Assistant Examiner*—Michael A. Masinick
*Attorney, Agent, or Firm*—Kirschstein, Kirschstein, Ottinger & Frank

[57] ABSTRACT

A vehicle head-up display system wherein symbols representing information required by an observer in the vehicle can be displayed in combination with a representation of the vehicle environment. First and second raster scan output signals of the same format respectively representing the desired symbols and the vehicle environment are produced by respective read-out arrangements from respective storage devices which respectively store representations of the desired symbols and the vehicle environment in response to input signals of different formats, the two raster scan output signals being combined for application to the display unit of the system.

4 Claims, 2 Drawing Figures

DISPLAY DEVICES

CROSS REFERENCE TO RELATED APPLICATION

This application is a continuation-in-part of copending application Ser. No. 465,146 filed Apr. 29, 1974, now abandoned for DISPLAY DEVICES.

This invention relates to head-up display systems, particularly for use in aircraft.

As is well known, a head-up display system consists of a semi-reflective combiner arranged in the line-of-sight of an observer, a display device, usually a cathode ray tube, for displaying information required by the observer and a collimating optical system for projecting the displayed information from the display device to the combiner. Thus the observer sees the displayed information against the background of the scene outside the aircraft. For the displayed information to be visible against the high ambient light conditions normally pertaining outside an aircraft, the display device operates in a stroke writing mode. However, it is sometimes desirable to use the display device to display a representation of the environment as may be developed by an imaging sensor, such as an airborne radar system. The signals developed by such sensors are of raster scan format and therefore it is not possible to display the normal information and the environmental representation at the same time. Moreover, such sensors frequently scan the environment at a slower rate than is desirable for optimum viewing.

It is an object of the invention to provide a head-up display system in which it is possible to display both types of information at the same time.

According to the invention, a head-up display system for a vehicle comprises:

a. a semi-reflective image combiner element adapted to be installed in the vehicle in front of an observer on the line of sight of the observer forward of the vehicle;

b. a display surface;

c. activating means operable to activate substantially any portion of the said surface so as to cause the said portion to emit light;

d. between the combiner element and the display surface, a collimating optical system which, when a display is present on the display surface as a result of activation as aforesaid, projects a collimated image of the display to the combiner element for reflection to the observer's eyes;

e. a first waveform generator responsive to input data signals derived from sensors carried by the vehicle and representing the relationship of the vehicle to its environment so as to repetitively develop a time sequence of output signals capable of being employed for controlling the activating means to activate desired line segments of the display surface thereby to present at said surface symbols representative of the aforesaid relationship;

f. a second waveform generator operable in response to signals derived from an imaging sensor carried by the vehicle to develop a raster scan output signal representative of the vehicle environment as sensed by the imaging sensor during the scan;

g. a symbol storage device operable in response to output signals from the first waveform generator so as to store symbols to be presented at the display surface;

h. a symbol read-out arrangement operable to develop a raster scan output signal representative of the symbols stored in the symbol storage arrangement said output signal having a higher scan rate than the output signal of said second waveform generator;

i. an image storage device operable in response to the output signal of the second waveform generator so as to store a representation of the environment sensed by the imaging sensor;

j. an image read-out arrangement operable to develop a raster scan output signal representative of the representation of the environment stored in the image storage device, the image read-out arrangement output signal having the same format as the symbol read-out arrangement output signal;

k. signal combiner circuitry operable to receive the output signals from both read-out arrangements so as to develop a raster scan output signal respresentative of both said symbols and said environment; and l. means for connecting either the output of the signal combiner cicuitry or the output signal of the first waveform generator to the activating means.

In a preferred arrangement in accordance with the invention in which said symbol storage device and said symbol read-out arrangement are combined to comprise an arrangement including two single-ended storage tubes connected and arranged so that in operation one operates in a storage mode for one period of time to store the output of said first waveform generator whilst the other operates in a reading mode to read out another part of the output signal of the first waveform generator in accordance with the required raster scan format, which other part had previously been stored in said other single-ended tube during an earlier period of time.

Similarly said image storing device and image read-out arrangement are preferably combined to comprise an arrangement including two single-ended storage tubes connected and arranged so that in operation one operates in a storage mode for one period of time to store the output of said second waveform generator whilst the other operates in a reading mode to read out another part of the output signal of the second waveform generator in accordance with the required raster scan format, which other part had previously been stored in said other single-ended tube during an earlier period of time.

By 'single-ended storage tube' is meant a storage tube in which storage and reading are accomplished by the same electron gun and the same deflection system.

The invention is hereinafter described with reference to the accompanying drawing in which.

Figure 1:
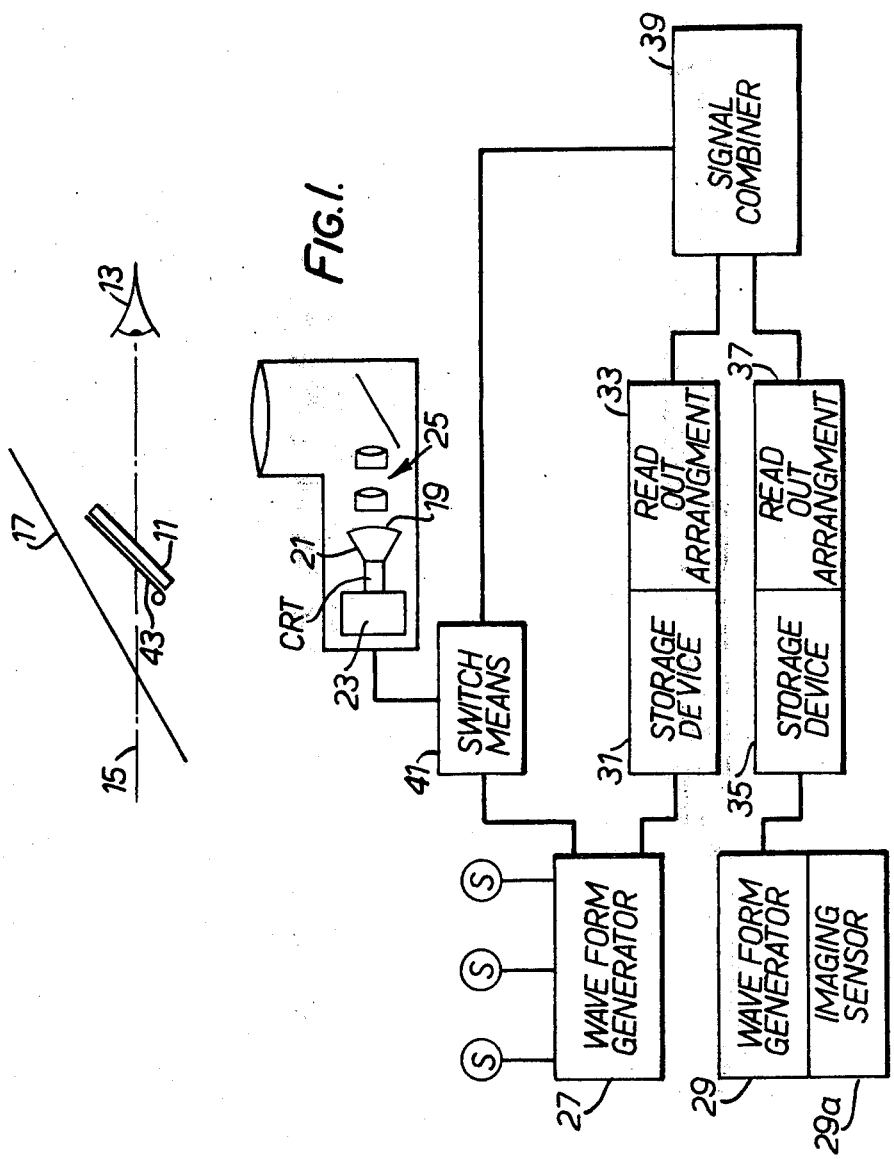
FIG. 1 is a synoptic diagram of display system installed in an aircraft.

The system comprises a semi-reflective image combiner element 11 installed in the aircraft in front of the pilot 13 on the pilot's line of sight 15 forward of the aircraft. The aircraft windshield is depicted by the reference numeral 17.

There is a primary display surface 19 which is constituted by the phosphor screen of a cathode ray tube (crt) 21. The activating means 23 for the phosphor screen comprises an electron gun (not shown) for directing an electron beam at the crt screen and deflection and bright-up circuitries (not shown) therefor operable to deflect and modulate the electron beam intensity so as to excite any desired portion of the phosphor screen to emit light.

Between the combiner element 11 and the phosphor screen there is a collimating optical system indicated, generally, at 25. Light emitted from the phosphor screen is transmitted collimated to the combiner element 11 from which it is reflected to the pilot's eyes. The light being collimated, the image reflected to the pilot is focussed at infinity i.e. is focussed on the distant scene transmitted through the semi-reflective combiner element.

A first waveform generator 27 receives input data signals from sensors S (not shown) carried by the aircraft and representing the relationship of the aircraft to its environment in space or time or in both space and time. The generator 27 is responsive to the said sensor signals so as to develop a stroke writing mode brightness and deflection output signal capable of being employed in controlling the activating means 23 so as to cause the activating means to excite desired line segments of the phosphor screen of the crt so as to present at the screen symbols representative of the aforesaid relationship of the aircraft to its environment.

Such waveform generators are well known and many such generators are described in U.S. patent specifications, for example U.S. Pat. No. 3,725,733, Graphic Display System, issued April 3, 1973 to J. M. Colston et at and U.S. Pat. No. 3,449,721, Graphical Display System, issued June 10, 1969 to M. L. Dertouzos et al.

The sensors S may comprise or include such instruments as gyros, accelerometers and air data sensors; the range of sensors chosen is determined by the characteristics of the display to be presented to the pilot in accordance with the operational requirement of the aircraft.

The system further includes a second waveform generator 29 which is responsive to signals derived from an imaging sensor 29a, also carried by the vehicle, which repetitively scans the environment at a relatively low scanning rate. The generator 29 develops a low scan rate output signal representative of the vehicle environment as sensed by the imaging sensor. The output signal typically has an r.θ scanning format but may have any other scanning format. The waveform generator 29 typically comprises an airborne radar. Such waveform generators are well known and many such generators are described in U.S. patent specifications, for example, U.S. Pat. No. 3,550,126, Monopulse Radar Apparatus, issued Dec. 22, 1970 to H. M. Van Hijfte et al, U.S. Pat. No. 3,343,166, Monopulse Radar Apparatus, issued Sept. 19, 1967 to M. Poinsard, U.S. Pat. No. 3,610,930, Independent Infra-red Landing Monitor, issued Oct. 5, 1971, to D. C. Lacy and C. F. Neukam, and U.S. Pat. No. 3,705,955, Blind Landing Aid Systems, issued Dec. 12, 1972, to G. Assouline, P. Conjeaud, P. Girault and E. Leiba.

A symbol storage device 31 is operable in response to output signals from the waveform generator 27 to store a representation of symbols to be presented to the pilot. Associated with the device 31 there is a symbol read-out arrangement 33 operable to cyclically scan the symbol storage device 31 in a rectangular raster so as to develop a raster scan output signal characteristic of the symbols and their spatial distribution on the symbol storage device 31. The scan rate employed in the arrangement is higher than that employed in the waveform generator 29.

An image storage device 35 is operable in response to the output signal of the waveform generator 29 to store a representation of the environment as sensed by the imaging sensor. Associated with the device 35 there is an image read-out arrangement 37 operable to cyclically scan the device 35 in a rectangular raster so as to develop a raster scan output signal representative of the vehicle environment as sensed by the imaging sensor. The output signal of the read-out arrangement 37 is of the same format including scan rate as the output signal of the read-out arrangement 33.

A signal combiner circuitry 39 receives the output of the image read-out arrangement 37 and optionally the output of the symbol read-out arrangement 33. It produces a raster scan output signal corresponding to the output of the image read-out arrangement 37 or a composite of the outputs of both read-out arrangements 33 and 37 depending on whether the output of the symbol read-out arrangement 33 is or is not required to be presented with the output of the image read-out arrangement 37.

Switch means 41 is provided for connecting either the output of the signal combiner circuitry 39 or the output of the waveform generator 27 to the activating means so that the image presented to the pilot at the combiner element 11 consists either of symbols produced by light emitted from excited line segments of the crt phosphor screen in response to the output of the generator 27 or light emitted from the phosphor screen 19 in response to the raster scan output signals of the combiner circuit 39.

Between the combiner element 11 and the aircraft windshield 17 there is a roller blind 43. When the blind 43 is rolled up no part of the blind obtrudes into the pilot's line of sight forward of the aircraft. If the image projected onto the combiner 11 from the phosphor screen 19 is of too low brightness relative to the brightness of light from the distant scene to be seen clearly, the blind 43 may be unrolled, as shown in FIG. 1, to provide a contrasting background for the image projected onto the combiner 11.

Figure 2:
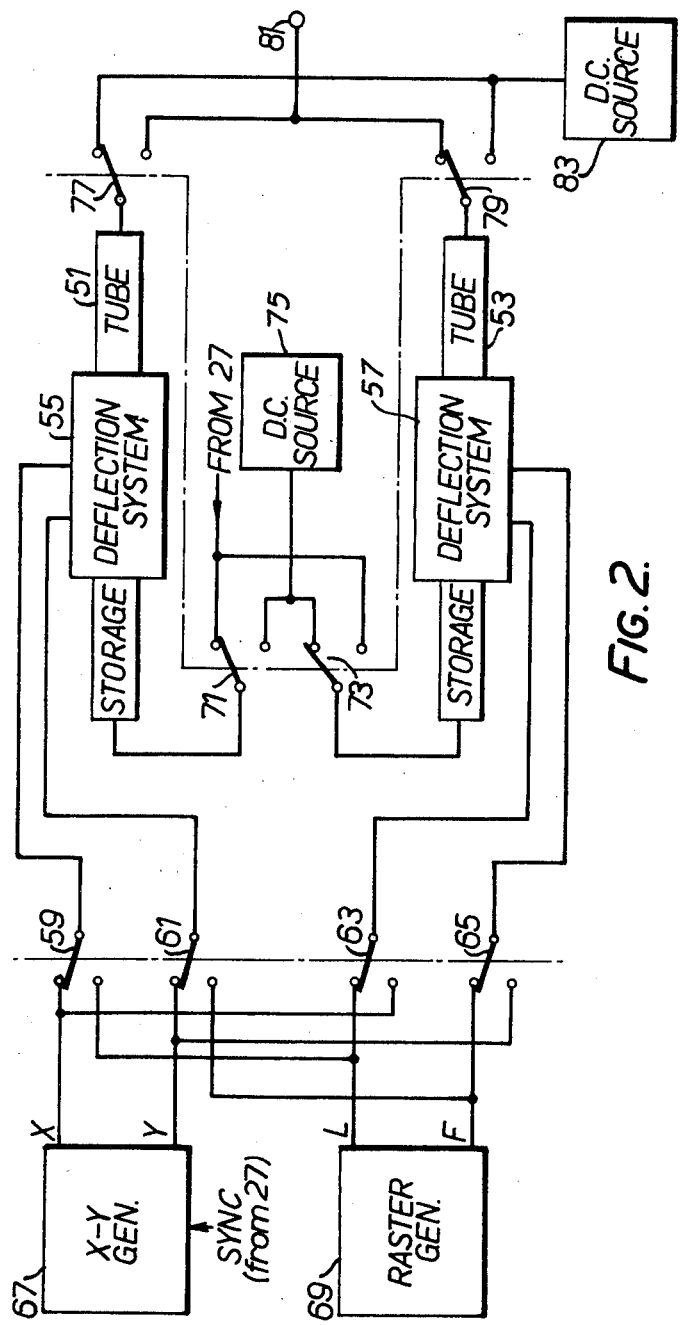
FIG. 2 is a schematic diagram of part of the system.

Preferably, the symbol storage device 31 and the symbol read-out arrangement 33 are combined in an arrangement as illustrated in FIG. 2.

Referring now to FIG. 2, the arrangement comprises two single-ended storage tubes 51 and 53 having respective electron beam deflection systems 55 and 57.

The deflection systems 55 and 57 are supplied via four ganged change-over switches 59, 61, 63 and 65 with X and Y co-ordinate deflection signals from a generator 67 synchronised with the stroke writing mode deflection output signals of waveform generator 27 and with field and line scanning signals from a rectangular raster generator 69 so that in one position of the switches the deflection systems 55 and 57 receive signals from the generators 67 and 69 respectively and in the other position of the switches the deflection systems 55 and 57 receive signals from the generators 69 and 67 respectively.

The beam control electrodes (not shown) of the storage tubes are connected via two further change-over switches 71 and 73 with the stroke writing mode brightness output signal from the generator 27 and with a source 75 of d.c. potential of a value such as to set the storage tube to whose beam control electrode it is applied in a reading mode. The switches 71 and 73 are so connected and ganged with the switches 59 to 65 so that the brightness output of the generator 27 is applied to the storage tube whose deflection system is receiving signals from the generator 67 and the d.c. potential is applied to the other storage tube.

The targets of the storage tubes are connected via two further change-over switches 77 and 79 to an output terminal 81 and a further source 83 of d.c. potential of a value such as to set the storage tube to whose target electrode it is applied in a storage mode.

In operation, the switches are operated at the end of each rectangular raster field period. Thus, during each field period one of the tubes operates in a storage mode to store on its target the stroke writing mode signal applied to from the waveform generator 27 whilst the other operates in a reading mode to read out from its target, in accordance with a raster scan format, the signal applied to it from the waveform generator 27 during the previous field period. Thus the stroke writing mode output signal of the waveform generator 27 appears at the terminal 81 in a raster scan format determined by the raster generator 69.

The image storage device 35 and the image read-out arrangement 37 are also suitably combined to form an arrangement similar to that shown in FIG. 2 utilising the same scanning generator 69, but deriving an input signal from the waveform generator 29 instead of the waveform generator 27 and using, in place of the generator 67, a raster scanning generator synchronised with the output signal of the waveform generator 29.

It will be appreciated that the scanning frequencies chosen for the generator 69 are chosen with a view to obtaining a satisfactory image at the display surface 19 and are higher than the corresponding parameters of the output signal of the waveform generator 29.

I claim:
1. A head-up display system for a vehicle comprising:
   a. a semi-reflective image combiner element adapted to be installed in the vehicle on the line of sight of an observer in the vehicle of a scene outside the vehicle;
   b. a display surface;
   c. activating means operable to activate substantially any portion of the said surface so as to cause the said portion to emit light;
   d. between the combiner element and the display surface a collimating optical system which, when a display is present on the display surface as a result of activation as aforesaid, projects a collimated image of the display to the combiner element for reflection to the observer's eyes, thereby effectively superimposing the image of the display on the observer's view of the outside scene through the combiner;
   e. a first waveform generator responsive to input data signals derived from sensors carried by the vehicle and representing the relationship of the vehicle to its environment so as to repetitively develop a time sequence of output signals capable of being employed for controlling the activating means to activate desired line segments of the display surface thereby to present at said surface symbols representative of the aforesaid relationship;
   f. a second waveform generator operable in response to signals derived from an imaging sensor carried by the vehicle to develop a raster scan output signal representative of the vehicle environment as sensed by the imaging sensor during the scan;
   g. a symbol storage device operable in response to output signals from the first waveform generator so as to store symbols to be presented at the display surface;
   h. a symbol read-out arrangement operable to develop a raster scan output signal representative of the symbols stored in the symbol storage arrangement, said output signal having a higher scan rate than the output signal of said second waveform generator;
   i. an image storage device operable in response to the output signal of the second waveform generator so as to store a representation of the environment sensed by the imaging sensor;
   j. an image read-out arrangement operable to develop a raster scan output signal representative of the representation of the environment stored in the image storage device, the image read-out arrangement output signal having the same format as the symbol read-out arrangement output signal;
   k. signal combiner circuitry operable to receive the output signals from both read-out arrangements so as to develop a raster scan output signal representative of both said symbols and said environment; and
   l. means for connecting either the output of the signal combiner circuitry or the output signal of the first waveform generator to the activating means.

2. A head-up display system according to claim 1 in which said symbol storage device and symbol read-out arrangement are combined to comprise an arrangement comprising: two single-ended storage tubes; means for operating said two storage tubes in reading and storage modes alternately, one tube being in its reading mode when the other is in its storage mode and vice versa; means for supplying the output signal of the first waveform generator together with deflection signals synchronized with the first waveform generator to the storage tube operating in its storage mode; means for supplying scanning signals at said higher scan rate to the storage tube operating in its reading mode; and means for deriving an output signal from the storage tube operating in its reading mode.

3. A head-up display system according to claim 1 in which said image storage device and image read-out arrangement are combined to comprise an arrangement comprising: two single-ended storage tubes; means for operating said two storage tubes in reading and storage modes alternately, one tube being in its reading mode when the other is in its storage mode and vice versa; means for supplying the output signal of the second waveform generator together with deflection signals synchronized with the second waveform generator to the storage tube operating in its storage mode; means for supplying scanning signals at said higher scan rate to the storage tube operating in its reading mode; and means for deriving an output signal from the storage tube operating in its reading mode.

4. A head-up display device according to claim 1 including means operable to introduce into the line of sight of the observer a contrasting background against which images reflected to the observer's eyes from the combiner may be viewed.

* * * * *